(12) United States Patent
Wang et al.

(10) Patent No.: US 11,890,668 B2
(45) Date of Patent: Feb. 6, 2024

(54) SYSTEM AND METHOD OF MAKING A CAST STEEL ALLOY CRANKSHAFT HAVING LOW POROSITY

(71) Applicant: GM Global Technology Operations LLC, Detroit, MI (US)

(72) Inventors: Liang Wang, Rochester Hills, MI (US); Qigui Wang, Rochester Hills, MI (US); Jianghuai Yang, Rochester Hills, MI (US); Kiran Mistry, Farmington Hills, MI (US); Oliver Patrick Jordan, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/839,680

(22) Filed: Jun. 14, 2022

(65) Prior Publication Data
US 2023/0398600 A1  Dec. 14, 2023

(51) Int. Cl.
*B22D 25/02* (2006.01)
*B22C 9/02* (2006.01)
(Continued)

(52) U.S. Cl.
CPC ............... *B22C 9/02* (2013.01); *B22D 19/04* (2013.01); *B22D 25/06* (2013.01);
(Continued)

(58) Field of Classification Search
CPC .......... B22C 9/02; B22D 19/04; B22D 25/06; B23P 2700/07; F16C 2202/06;
(Continued)

(56) References Cited

U.S. PATENT DOCUMENTS

2012/0301347 A1*  11/2012  Muralidharan ......... C22C 38/48
420/586.1

FOREIGN PATENT DOCUMENTS

CN      102259159 A  *  11/2011
CN      102989942 A  *   3/2013
(Continued)

OTHER PUBLICATIONS

English translation of CN108176822 (Year: 2018).*
(Continued)

*Primary Examiner* — Jun S Yoo
(74) *Attorney, Agent, or Firm* — Vivacqua Crane PLLC

(57) ABSTRACT

Systems and methods of making a cast steel alloy crankshaft for an internal combustion engine are provided. The method comprises providing a mold of the crankshaft. The mold has cavities to form the crankshaft. The method further comprises melting a first metallic material at between 1400 degrees Celsius (° C.) and 1600° C. to define a molten metallic material. In addition, the method further comprises feeding the molten metallic material at a riser connection angle of between 30° and 75° in the cavities of the negative sand cast mold. The method further comprises cooling the molten metallic material at a solidification time of between 5 seconds (sec) and 20 sec in the negative sand cast mold with at least one chill member to define a solidified metallic material having dimensions of the cast steel alloy crankshaft. Furthermore, the method comprises separating the solidified metallic material from the negative sand cast mold to define the cast steel alloy crankshaft.

7 Claims, 4 Drawing Sheets

(51) Int. Cl.
*B22D 19/04* (2006.01)
*B22D 25/06* (2006.01)

(52) U.S. Cl.
CPC ....... *B23P 2700/07* (2013.01); *F16C 2202/06* (2013.01); *F16C 2202/10* (2013.01); *F16C 2204/60* (2013.01); *F16C 2220/06* (2013.01); *Y10T 29/17* (2015.01); *Y10T 29/49286* (2015.01)

(58) Field of Classification Search
CPC .............. F16C 2202/10; F16C 2204/60; F16C 2220/06; Y10T 29/17; Y10T 29/49286
See application file for complete search history.

(56) References Cited

FOREIGN PATENT DOCUMENTS

| | | | | |
|---|---|---|---|---|
| CN | 207127214 U | * | 3/2018 | |
| CN | 108176822 A | * | 6/2018 | ............... B22C 9/02 |

OTHER PUBLICATIONS

English translation of CN102259159 (Year: 2011).*
English translation of CN207127214 (Year: 2018).*
English translation of CN102989942 (Year: 2013).*

* cited by examiner

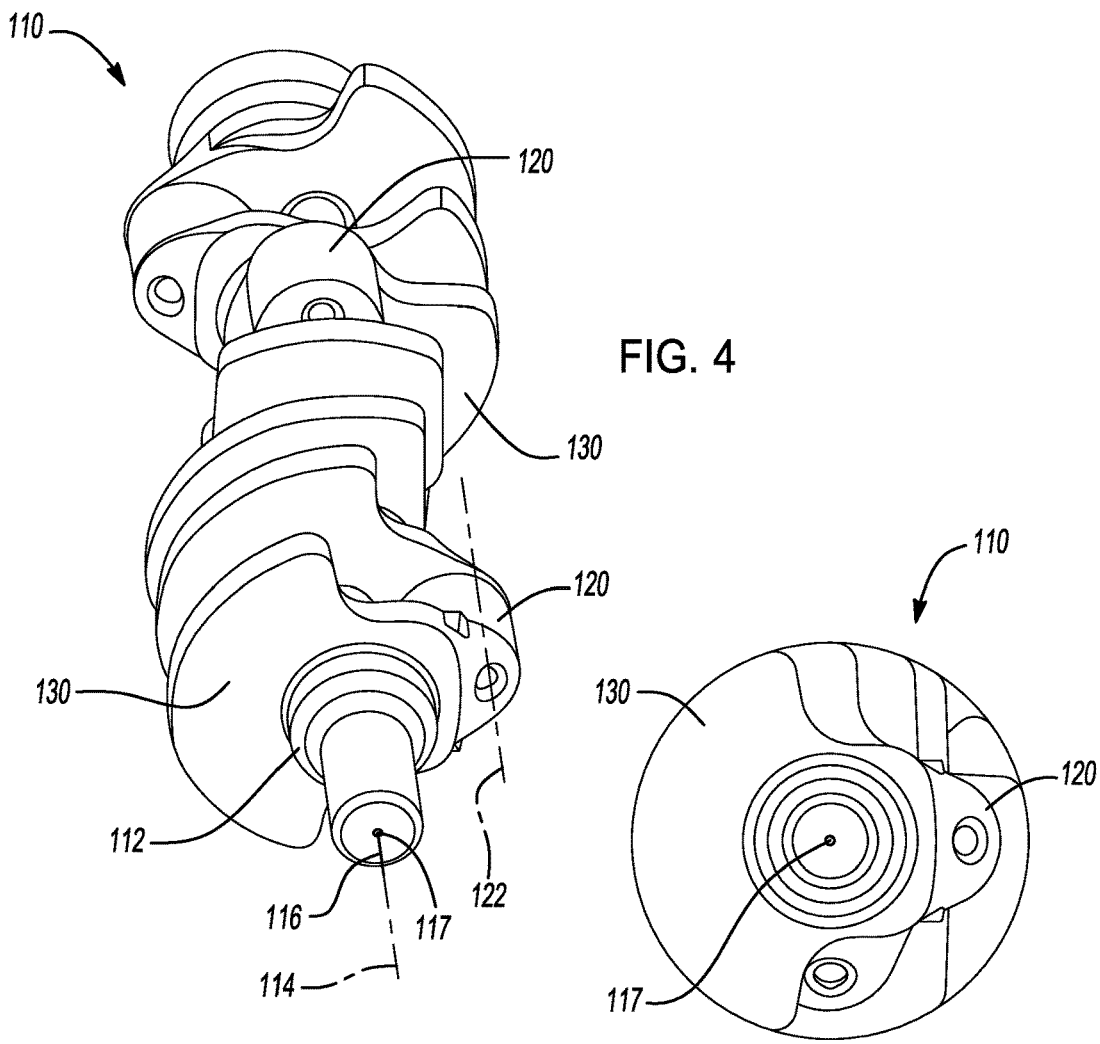
FIG. 4
FIG. 5
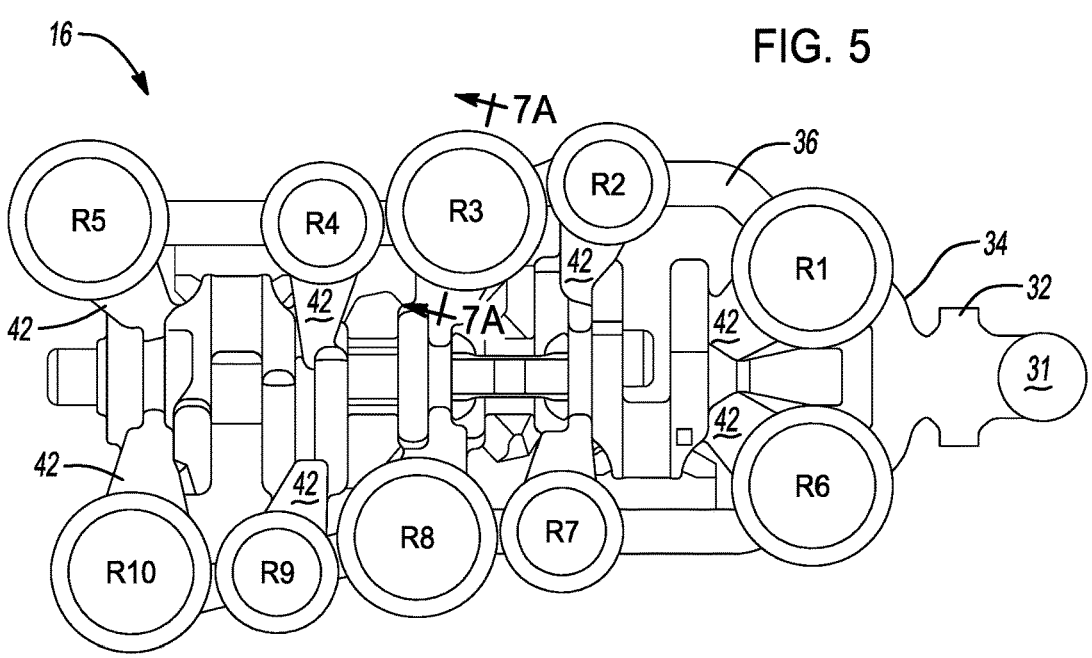
FIG. 6

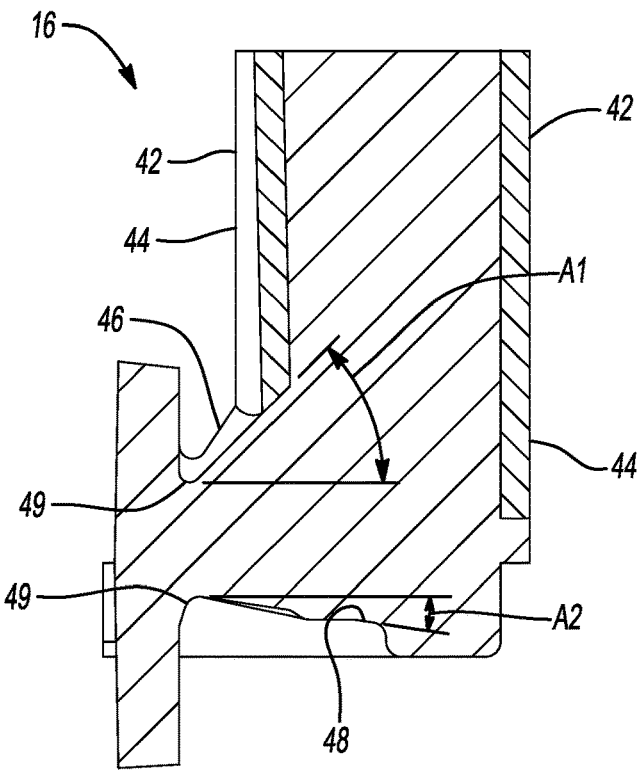
FIG. 7A
| Riser # | A1 | A2 |
|---|---|---|
| 1 | 45 | 10 |
| 2 | 45 | 10 |
| 3 | 55 | 10 |
| 4 | 30 | 1 |
| 5 | 45 | 10 |
| 6 | 45 | 10 |
| 7 | 45 | 10 |
| 8 | 55 | 10 |
| 9 | 35 | 1 |
| 10 | 45 | 10 |
Riser Connection Angles
FIG. 7B
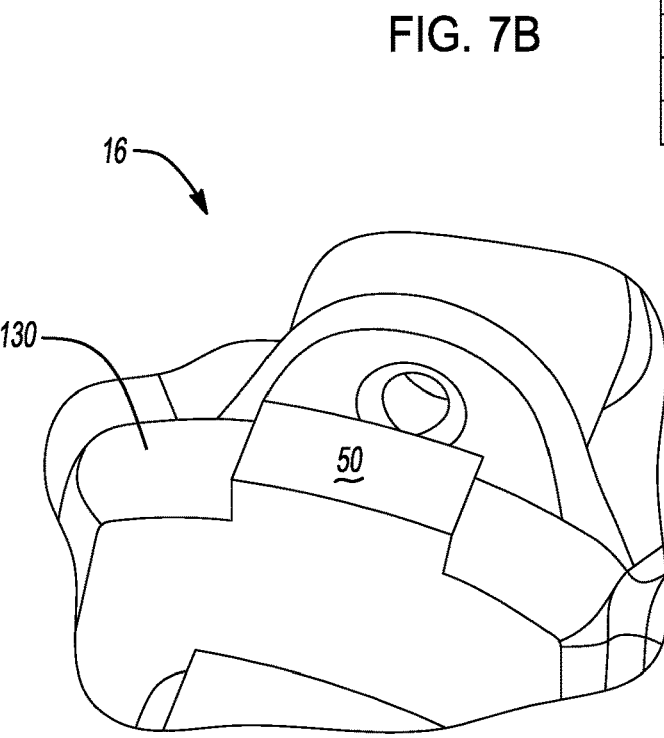
FIG. 8

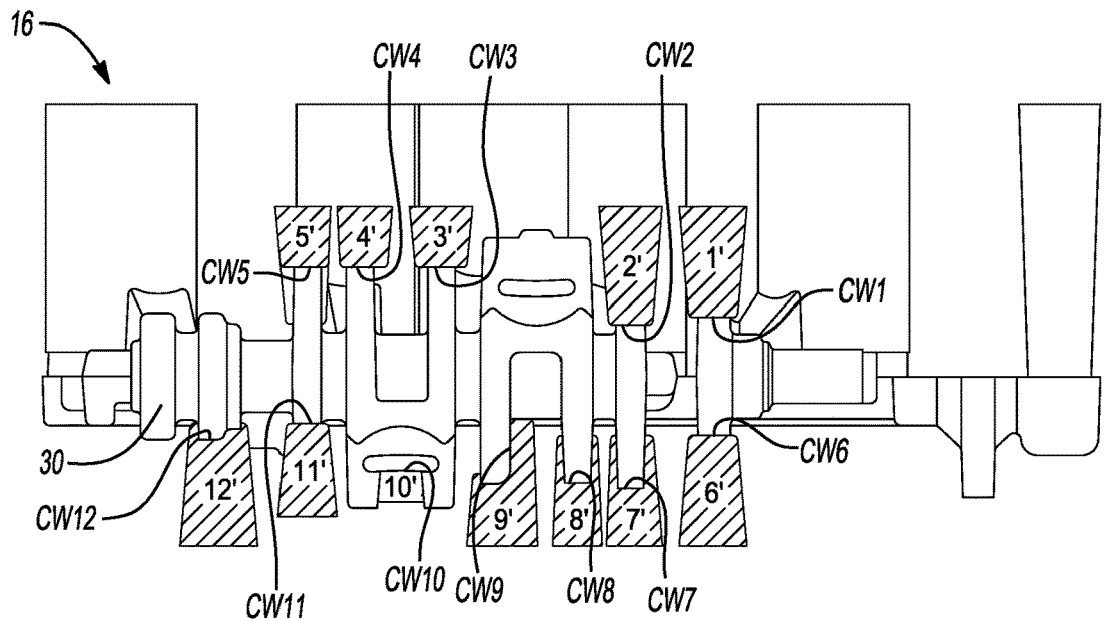
FIG. 9A
| Counterweight Chill # | Solidification Time with Chill(s) |
|---|---|
| 1' | 6 |
| 2' | 6 |
| 3' | 8 |
| 4' | 8 |
| 5' | 5 |
| 6' | 18 |
| 7' | 9 |
| 8' | 7 |
| 9' | 6 |
| 10' | 15 |
| 11' | 6 |
| 12' | 7 |
FIG. 9B
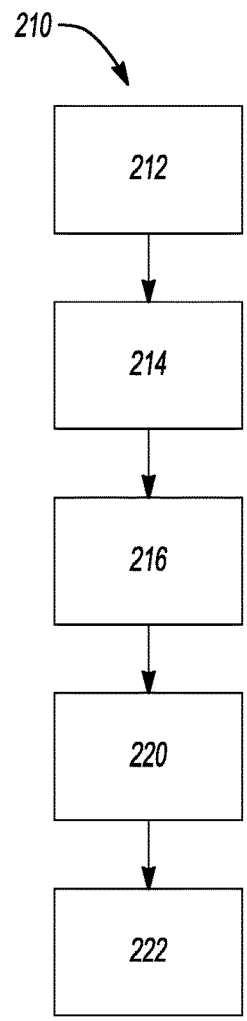
FIG. 10

SYSTEM AND METHOD OF MAKING A CAST STEEL ALLOY CRANKSHAFT HAVING LOW POROSITY

GOVERNMENT LICENSE RIGHTS

This invention was made with government support under contract No. DE-EE0008877 awarded by the U.S. Department of Energy. The government has certain rights in the invention.

INTRODUCTION

The present disclosure relates to crankshafts and, more particularly, systems and methods of manufacturing cast steel alloy crankshafts having low porosity for vehicles.

A crankshaft is a vehicle part able to perform a conversion between reciprocating motion and rotational motion. Crankshafts may be made in numerous manners such as by way of billet, forging, and casting. Currently, the manufacture of cast steel alloy crankshafts may be improved to result in mass efficiency and cost saving.

SUMMARY

Thus, while current crankshafts achieve their intended purpose, there is a need for a new and improved system and method for manufacturing vehicular crankshafts, such as cast steel alloy crankshafts. In accordance with embodiments and examples discussed herein, the present disclosure provides systems and methods of manufacturing a vehicular cast steel alloy crankshaft having low porosity. In turn, a manufacturing cost savings is realized.

In accordance with one aspect of the present disclosure, a method of manufacturing a cast steel alloy crankshaft for an internal combustion engine is provided. The method comprises providing a negative sand cast mold of the crankshaft. The negative sand cast mold has cavities to form the crankshaft. The crankshaft comprises at least four main journals aligned on a crankshaft axis of rotation defining a centerline and at least three pin journals.

In this aspect, each pin journal is disposed about a respective pin journal axis and positioned between the main journals. Moreover, each of the respective pin journal axes is oriented parallel to and spaced radially from the crankshaft axis. Each of the pin journals is joined to a pair of crank arms for force transmission between the pin journal and the pair of crank arms. Additionally, each pair of crank arms is joined to a respective main journal for transmitting torque between the pair of crank arms and the main journal. Furthermore, each crank arm has a counterweight disposed opposite a respective pin journal relative to the centerline for balance and stability.

In this aspect, the method further comprises melting a first metallic material at a predetermined temperature (e.g., between 1400 degrees Celsius (° C.) and 1600° C.) to define a molten metallic material. In addition, the method further comprises feeding the molten metallic material at a riser connection angle of between 30° and 75° in the cavities of the negative sand cast mold.

The method further comprises cooling the molten metallic material at a predetermined solidification time in the negative sand cast mold to define a solidified metallic material having dimensions of the cast steel alloy crankshaft. Furthermore, the method comprises separating the solidified metallic material from the negative sand cast mold to define the cast steel alloy crankshaft.

In one example of this aspect, the solidification time is between 5 sec and 20 sec in the negative sand cast mold to define the solidified metallic material. In another example, the solidified metallic material has a porosity of less than 10 percent (%). In yet another example, the solidified metallic material has an ultimate tensile strength (UTS) of 900 megapascal (MPa) to 1200 MPa, a yield strength (YS) greater than 750 MPa, and elongation (EL) of 5% to 10%.

In an example of this aspect, the first metallic material comprises 0.29 weight percent (wt %) to 0.65 wt % carbon (C), 0.40 wt % to 0.80 wt % silicon (Si), 0.6 wt % to 1.5 wt % manganese (Mn), at least 0.03 wt % phosphorous (P); 0.04 wt % to 0.07 wt % sulfur (S), 0.8 wt % to 1.4 wt % chromium (Cr), 0.2 wt % to 0.6 nickel (Ni), 0.15 wt % to 0.55 wt % molybdenum (Mo), 0.25 wt % to 2.0 wt % copper (Cu), at least 0.03 wt % titanium (Ti), 0.07 wt % to 0.17 wt % vanadium (V), 0.02 wt % to 0.06 wt % aluminum (Al), at least wt % nitrogen (N), 0.01 wt % to 0.06 wt % one of cerium (Ce) and lanthanum (La), and a balance of iron (Fe).

In one example, the riser connection angle is between 31° and 65°. In another example, the riser connection angle is between 30° and 55°. In still another example, the method further comprises, prior to the step of feeding, disposing a chill member on at least one counterweight of the negative sand cast mold.

In another aspect of the present disclosure, a system for manufacturing a cast steel alloy crankshaft for a vehicle is provided. The system comprises a molding unit arranged to form a negative sand cast mold of the cast steel alloy crankshaft. In this aspect, the mold comprises at least one molded cavity formed therein and having a pattern with dimensions of the steel alloy crankshaft. The crankshaft comprises at least four main journals aligned on a crankshaft axis of rotation defining a centerline formed through a middle point of each main journal and a horizontal plane formed longitudinally along the centerline. The horizontal plane defines a top cut half and a bottom drag half of the mold. The crankshaft further comprises at least three pin journals.

In this aspect, each pin journal is disposed about a respective pin journal axis and positioned between the main journals. Moreover, each of the respective pin journal axes is oriented parallel to and spaced radially from the crankshaft axis. Additionally, each of the pin journals is joined to a pair of crank arms for force transmission between the pin journal and the pair of crank arms. Each pair of crank arms is joined to a respective main journal for transmitting torque between the pair of crank arms and the main journal. Furthermore, each crank arm has a counterweight disposed opposite a respective pin journal relative to the centerline for balance and stability.

In this aspect, the system further comprises a furnace arranged to melt a first metallic material at a predetermined temperature (e.g., between 1400 degrees Celsius (° C.) and 1600° C.) to define a molten metallic material. Moreover, the system further comprises a feeding mechanism arranged to feed the molten metallic material in the at least one cavity of the mold. In this aspect, the feeding mechanism comprises a riser arranged to have a connector through which the molten metallic material flows. The connector has a neck in fluid communication with the at least one mold cavity. The connector has an open end arranged to flare from the neck to the at least one mold cavity defining a riser connection angle of between 30° and 75° relative to the horizontal plane.

The system further comprises a cooling area arranged to solidify the molten metallic material at a predetermined solidification time in the negative sand cast mold to define a solidified metallic material having dimensions of the cast steel alloy crankshaft. In addition, the system further comprises a separation unit arranged to separate the solidified metallic material from the negative sand cast mold to define the cast steel alloy crankshaft.

The system further comprises a controller in communication with the molding unit, the furnace, the feeding mechanism, and the separation unit. The controller is configured to control the molding unit, the furnace, the pouring mechanism, and the separation unit. Furthermore, the system comprises a power source configured to power the molding unit, the furnace, the feeding mechanism, the separation unit, and the controller.

In one embodiment, the solidification time is between 5 sec and 20 sec defining the solidified metallic material. In another embodiment, the solidified metallic material has a porosity of less than 10 percent (%). In yet another embodiment, the solidified metallic material has an ultimate tensile strength (UTS) of 900 megapascal (MPa) to 1200 MPa, a yield strength (YS) greater than 750 MPa, and elongation (EL) of 5% to 10%.

In an embodiment of this aspect, the first metallic material comprises: 0.29 weight percent (wt %) to 0.65 wt % carbon (C), 0.40 wt % to 0.80 wt % silicon (Si), 0.6 wt % to 1.5 wt % manganese (Mn), at least 0.03 wt % phosphorous (P); 0.04 wt % to 0.07 wt % sulfur (S), 0.8 wt % to 1.4 wt % chromium (Cr), 0.2 wt % to 0.6 nickel (Ni), 0.15 wt % to 0.55 wt % molybdenum (Mo), 0.25 wt % to 2.0 wt % copper (Cu), at least 0.03 wt % titanium (Ti), 0.07 wt % to 0.17 wt % vanadium (V), 0.02 wt % to 0.06 wt % aluminum (Al), at least wt % nitrogen (N), 0.01 wt % to 0.06 wt % one of cerium (Ce) and lanthanum (La), and a balance of iron (Fe).

In one embodiment, the riser connection angle is between 31° and 65°. In another embodiment, the riser connection angle is between 30° and 55°. In yet another embodiment, the cooling area comprises a chill member disposed on at least one counterweight of the negative sand cast mold. In still another embodiment, the riser is a plurality of risers.

In yet another aspect of the present disclosure, a cast steel alloy crankshaft for an internal combustion engine is provided. The crankshaft comprises at least four main journals aligned on a crankshaft axis of rotation defining a centerline, and at least three pin journals. Each pin journal is disposed about a respective pin journal axis and positioned between the main journals. Each of the respective pin journal axes is oriented parallel to and spaced radially from the crankshaft axis. Each of the pin journals is joined to a pair of crank arms for force transmission between the pin journal and the pair of crank arms. Each pair of crank arms is joined to a respective main journal for transmitting torque between the pair of crank arms and the main journal. Each crank arm has a counterweight disposed opposite a respective pin journal relative to the centerline for balance and stability.

In this aspect, each main journal and each pin journal comprises a first metallic material having a porosity of less than 15 percent. The first metallic material comprises 0.29 weight percent (wt %) to 0.65 wt % carbon (C), 0.40 wt % to 0.80 wt % silicon (Si), 0.6 wt % to 1.5 wt % manganese (Mn), at least 0.03 wt % phosphorous (P); 0.04 wt % to 0.07 wt % sulfur (S), 0.8 wt % to 1.4 wt % chromium (Cr), 0.2 wt % to 0.6 nickel (Ni), 0.15 wt % to 0.55 wt % molybdenum (Mo), 0.25 wt % to 2.0 wt % copper (Cu), at least 0.03 wt % titanium (Ti), 0.07 wt % to 0.17 wt % vanadium (V), 0.02 wt % to 0.06 wt % aluminum (Al), at least 0.03 wt % nitrogen (N), 0.01 wt % to 0.06 wt % one of cerium (Ce) and lanthanum (La), and a balance of iron (Fe).

In one embodiment, the first metallic material has a porosity of less than 10 percent. In another embodiment, the first metallic material has an ultimate tensile strength (UTS) of 900 megapascal (MPa) to 1200 MPa, a yield strength (YS) greater than 750 MPa, and elongation (EL) of 5% to 10%.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a perspective top view of the crankshaft in FIG. 2.

FIG. 5 is an end view of the crankshaft of FIG. 4.

FIG. 6 is a top view of a feeding mechanism of the system of FIG. 1 in accordance with one embodiment.

FIG. 7A is a cross sectional side view of a riser of the feeding mechanism in FIG. 6 taken along lines 7-7.

FIG. 7B is a table of riser connection angles of risers in FIG. 6 in accordance with one example.

FIG. 8 is a perspective view of chill members of the feeding mechanism of FIG. 6.

FIG. 9A is a side view of the feeding mechanism in FIG. 6.

FIG. 9B is a table solidification times of chill members of FIG. 9A.

FIG. 10 is a flowchart of a method of manufacturing a cast steel alloy crankshaft by the system in FIG. 1 in accordance with one example of the present disclosure.

DETAILED DESCRIPTION

The following description is merely exemplary in nature and is not intended to limit the present disclosure, application, or uses.

Figure 1:
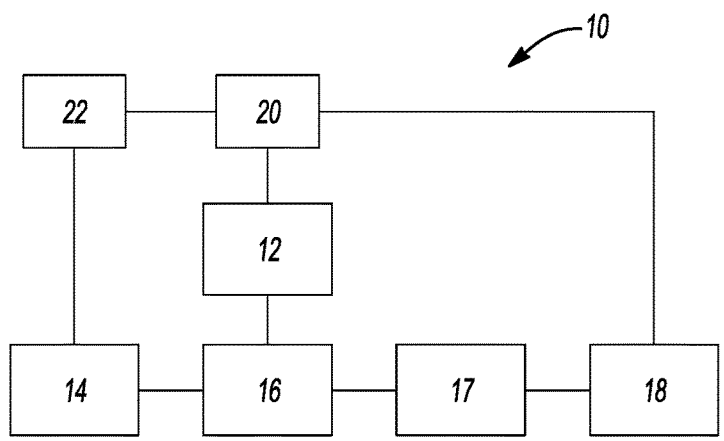
FIG. 1 is a schematic view of a system for manufacturing a cast steel alloy crankshaft having low porosity for a vehicle in accordance with one embodiment of the present disclosure.

FIG. 1 depicts a system 10 for manufacturing a cast steel alloy crankshaft 110 (FIG. 2) with low porosity for a vehicle in accordance with one embodiment of the present disclosure. As shown, the system 10 comprises a molding unit 12 arranged to have a negative sand cast mold 30 (see FIG. 9A) of the cast steel alloy crankshaft 110. The mold 30 comprises at least one molded cavity, preferably a plurality of molded cavities, to define the crankshaft to be cast. The molding unit 12 is arranged to make the mold 30 having a pattern with dimensions of the crankshaft. In one example, the mold 30 has patterns made with green or chemically bonded sand. An assembly of core may then be disposed within the mold to further define the dimensions or structure of the pattern. It is to be understood that the mold may be made by any other suitable manner without departing from the spirit or scope of the present disclosure.

Figure 2:
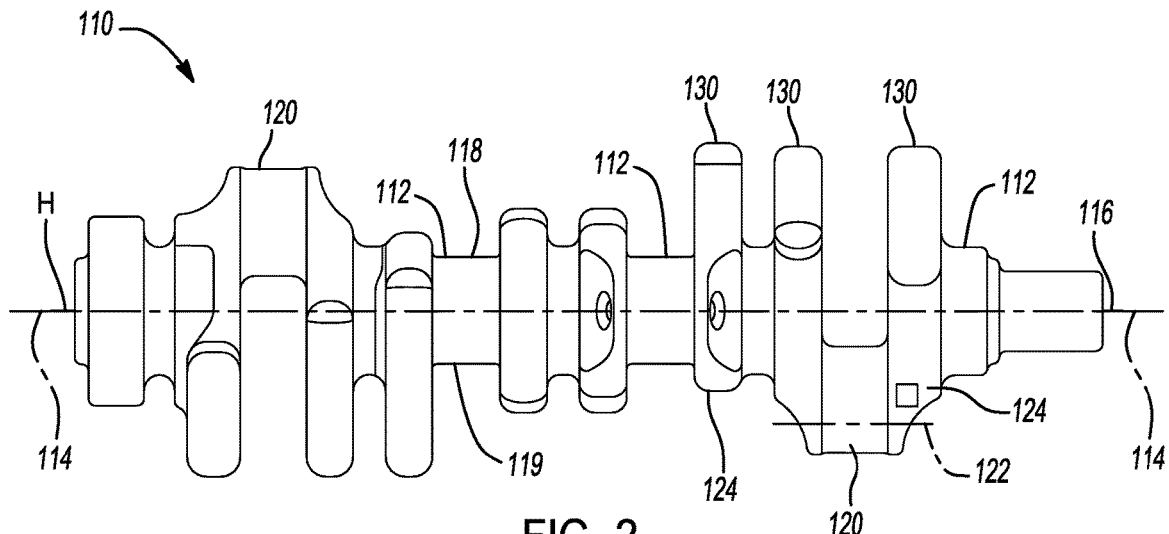
FIG. 2 is a side view of a crankshaft made by the system of FIG. 1 in accordance with one embodiment.
Figure 3:
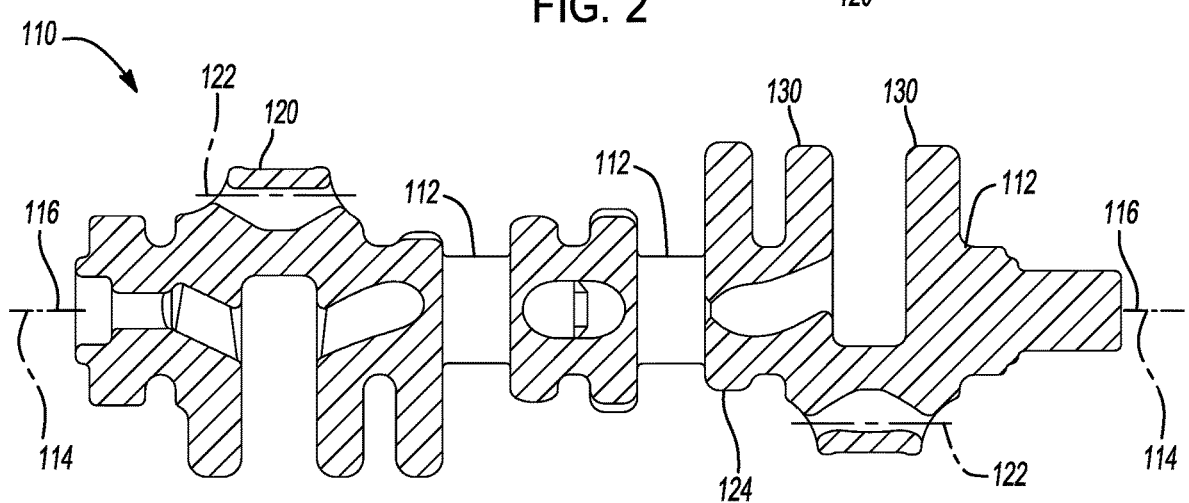
FIG. 3 is a cross sectional view of the crankshaft of FIG. 2 taken along lines 3-3.

Referring to FIGS. 2-3 as an example, the crankshaft 110 is designed or arranged to comprise at least four main journals 112 aligned on a crankshaft axis 114 of rotation defining a centerline 116 and a horizontal plane H. As shown, the centerline 116 is formed through a middle point 117 of each main journal 112 and the horizontal plane H is formed longitudinally along the centerline 116. The horizontal plane H defines a top cut half 118 and a bottom drag half 119 of the crankshaft 110.

The crankshaft 110 is designed or arranged to comprises at least three pin journals 120. As shown, each pin journal 120 is disposed about a respective pin journal axis 122 and positioned between the main journals 112. Moreover, each pin journal axis 122 is oriented parallel to and spaced radially from the crankshaft axis 114. Additionally, each of the pin journals 120 is joined to a pair of crank arms 124 for force transmission between the pin journal 120 and the pair of crank arms 124. Further, each pair of crank arms 124 is joined to a respective main journal 112 for transmitting torque between the pair of crank arms 124 and the main journal 112. In addition, each of the main journals 112, pin journals 120, and crank arms 124 is made of a first metallic material.

As depicted in FIGS. 2 and 3 as an example, at least one of the crank arms 124 is arranged to have a molded counterweight 130. Moreover, each molded counterweight 130 is disposed opposite a respective pin journal 120 relative to the centerline 116 for balance and stability. During manufacturing of the crankshaft 110, the counterweight 130 is molded to one of the crank arms.

In one embodiment, the first metallic material comprises a steel alloy having a rare earth metal such as cerium or lanthanum. Preferably, the first metallic material is made of a composition comprising 0.29 weight percent (wt %) to 0.65 wt % carbon (C), 0.40 wt % to 0.80 wt % silicon (Si), 0.6 wt % to 1.5 wt % manganese (Mn), at least 0.03 wt % phosphorous (P); 0.04 wt % to 0.07 wt % sulfur (S), 0.8 wt % to 1.4 wt % chromium (Cr), 0.2 wt % to 0.6 nickel (Ni), 0.15 wt % to 0.55 wt % molybdenum (Mo), 0.25 wt % to 2.0 wt % copper (Cu), at least 0.03 wt % titanium (Ti), 0.07 wt % to 0.17 wt % vanadium (V), 0.02 wt % to 0.06 wt % aluminum (Al), at least 0.03 wt % nitrogen (N), 0.01 wt % to wt % of one of cerium (Ce) and lanthanum (La), and a balance of iron (Fe).

More preferably, the first metallic material comprises: 0.35 wt % C, 0.45 wt % Si, 1.0 wt % Mn, at least 0.03 wt % P, 0.06 S, 1.0 wt % Cr, 0.2 wt % Ni, 0.25 wt % Mo, 0.45 wt % Cu, at least 0.03 wt % Ti, 0.1 wt % V, 0.03 wt % Al, at least 0.03 wt % N, 0.02 wt % of one of Ce and La, and a balance of Fe.

In another embodiment, the first metallic material of the crankshaft has a porosity of less than 15 percent (%), and preferably less than 10%. Moreover, the first metallic material has an ultimate tensile strength (UTS) of 900 megapascal (MPa) to 1200 MPa, a yield strength (YS) greater than 750 MPa, and elongation (EL) of 5% to 10%.

Referring back to FIG. 1, the system 10 further comprises a furnace 14 for melting the first metallic material (e.g., steel alloy) at between 1400 degrees Celsius (° C.) and 1600° C. to define a molten metallic material. In one embodiment, the furnace 14 may be charged with steel alloy. The furnace 14 may be an electric arc furnace, an induction furnace, or any other suitable furnace without departing from the spirit or scope of the present disclosure.

As shown in FIGS. 1 and 6, the system 10 further comprises a feeding mechanism 16 arranged to feed the molten metallic material in the at least one cavity of the mold 30 defining the dimensions of the crankshaft 110 to be cast. In one example, the feeding mechanism 16 comprises a pouring ladle (not shown), a down sprue 31, a filter 32 in fluid communication with the down sprue 31, a runner 34 in fluid communication with the down sprue, 31 and at least one riser in fluid communication with the runner and the at least one cavity of the mold. In this example, the feeding mechanism 16 comprises a plurality of risers R1-R10 as shown in FIG. 6.

In this example, the pouring ladle receives molten metallic material (e.g., steel alloy) for pouring the molten metallic material in the down sprue 31 having the filter 32 to eliminate oxides from the molten metallic material. As mentioned, the down sprue 31 is in fluid communication with the runner 34 (here, a double runner with first and second wings 36, 38) through which the molten metallic material flows from the filter 32. As shown, the runner 34 is connected to the risers R1-R10 such that molten metallic material is fed thereto. As such, the runner 34 is arranged to be in fluid communication with the risers R1-R10 to which the molten metallic material is fed.

As depicted in FIGS. 6-7A, each riser, e.g. the riser R3, is arranged to have a connector 42 through which the molten metallic material flows. The connector 42 has a neck 44 in fluid communication with the at least one mold cavity. As shown in FIGS. 7A-7B, the neck 44 is arranged to flare or extend from a wall 46 of the connector 42 towards the mold 30. Moreover, the neck 44 extends to an internal base 48 wherein the internal base 48 is arranged to extend, e.g., on an incline, towards the mold 30. As shown, the neck 44 and internal base 48 extend to an open end 49 through which molten metallic material may pass to the mold 30. In turn, the neck 44 and the internal base 48 define a general riser connection angle of between 30° and 75° relative to the horizontal plane. In one embodiment, the general riser connection angle is between 31° and 65°. In another embodiment, the general riser connection angle is between 30° and 55°.

Referring to FIGS. 6-7B, the neck 44 defines a first riser connection angle A1 and the internal base 48 defines a second riser connection angle A2 relative to the horizontal plane H. As it can be seen in FIG. 7B, each of the risers R1-R10 has first and second riser connection angles A1, A2, each of which may differ depending on dimensions of the crankshaft. For example, the riser R4 has a first riser connection angle A1 of 30° and a second riser connection angle A2 of 1°. Thereby, the riser R4 has a general riser connection angle of 31°. Whereas, the riser R5 has a first riser connection angle A1 of 45° and a second riser connection angle A2 of 10°. Thereby, the riser R5 has a general riser connection angle of 55°.

The mold 30 may then be gated or sealed with chemically bonded sand. Thereafter, the molten metallic material is allowed to cool to about 450° C. in a designated cooling area (discussed below) to solidify the molten metallic material in the plurality of molded cavities of the mold to form a target component having dimensions of the crankshaft. Preferably, the crankshaft is made of steel alloy comprising the composition discussed above.

Additionally, the system 10 further comprises a cooling area 17 arranged to solidify the molten metallic material. As such, the cooling area 17 solidifies the molten metallic material at a solidification time of between 5 seconds sec and 20 sec in the negative sand cast mold to define a solidified metallic material having dimensions of the cast steel alloy crankshaft 110. In another embodiment, the solidification time is between 10 sec and 15 sec defining the solidified metallic material.

To achieve a desired solidification time range, the cooling 17 area may comprise a chill member disposed on at least one counterweight of the negative sand cast mold. As shown in FIG. 8, a chill member 50 is disposed on a counterweight 130 of the mold 30. When molten metallic material is fed into the cavities of the mold 30, the chill member 50 provides a more rapid cooling effect to solidify the molten metallic material to the solidified metallic material.

Referring to FIGS. 9A-9B, chill members 1'-12' are disposed on the counterweight portions CW1-CW12 respectively of the mold 30 prior to feeding the mold with molten metallic material. As mentioned above, the chill members 1'-12' provide a more rapid solidification of the molten metallic material to define the solidified metallic material. Solidification times may differ. For example, chill member 1' is disposed on the counterweight at position CW1 which results in a 6 sec solidification time when molten metallic material is fed in the mold. Whereas, chill member 3' is disposed on the counterweight at position CW3 which results in an 8 sec solidification time when molten metallic material is fed in the mold.

Referring back to FIG. 1, the system 10 further comprises a separation unit 18 for separating the target component of the crankshaft from the negative sand cast mold to define the cast steel alloy crankshaft 110. In one embodiment, the separation unit 18 is arranged to shakeout or remove the mold comprising the chemically bonded sand from the target component. To accomplish removal of the mold from the target component, an automated unit may be used to break the mold and obtain the target component therefrom. For example, a vibration unit or table may be used having a bottom catch screen for receiving mold particles from the mold. It is to be understood that breaking the mold by any other suitable manner may be used without departing from the spirit or scope of the present disclosure.

In this embodiment, the separation unit 18 is further arranged to degate the target component after removing the mold from the target component. As known in the art, degating the target component may involve removing parts of bonded sand used to fill the mold during casting and gating.

In one embodiment, the separation unit 18 is further arranged to clean the target component after degating. In one example, a shot blast machine may be used to apply or shoot beads (e.g. metallic beads) on surfaces of the target component. To meet alloy design expectations, the separation unit 18 may also include an inspection area wherein the target component is inspected for its mechanical dimensions, mechanical properties, chemical composition, and microstructure. In one example, a computerized system such as a coordinate measuring machine (CMM) may be used to measure mechanical dimensions of the target component, defining the crankshaft 110. Any suitable methods and apparatus may be used to evaluate dimensions, mechanical properties, chemical composition, and microstructure of the crankshaft without departing from the spirit or scope of the present disclosure.

Referring back to FIG. 1, the system 10 further comprises at least one controller 20 in communication with the molding unit 12, the furnace 14, the feeding mechanism 16, and the separation unit 18. The controller 20 is configured to control the molding unit 12, the furnace 14, the feeding mechanism 16, and the separation unit 18. Furthermore, the system 10 comprises a power source 22 configured to power the molding unit 12, the furnace 14, the feeding mechanism 16, the separation unit 18, and the controller 20.

FIG. 10 depicts a method 210 of manufacturing a cast steel alloy crankshaft having low porosity for a vehicle in accordance with one example of the present disclosure. In this example, the method 210 may be implemented by the system of FIG. 1. As shown, the method 210 comprises in box 212 providing a negative sand cast mold for the cast steel alloy crankshaft. As discussed above and shown in FIGS. 2-5, the crankshaft 110 is designed or arranged to comprise at least four main journals 112 aligned on a crankshaft axis 114 of rotation defining a centerline 116. As shown, the centerline 116 is formed through a middle point 117 of each main journal 112 and a horizontal plane H is formed longitudinally along the centerline 116. As shown, the horizontal plane H defines a top cut half 118 and a bottom drag half 119. The crankshaft 110 further comprises at least three pin journals 120.

In this embodiment, each pin journal 120 is disposed about a respective pin journal axis 122 and positioned between the main journals 112. Moreover, each pin journal axis 122 is oriented parallel to and spaced radially from the crankshaft axis 114. Additionally, each of the pin journals 120 is joined to a pair of crank arms 124 for force transmission between the pin journal 120 and the pair of crank arms 124. Further, each pair of crank arms 124 is joined to a respective main journal 112 for transmitting torque between the pair of crank arms 124 and the main journal 112.

As depicted in FIGS. 2-5 as an example, at least one of the crank arms 124 is arranged to have a counterweight 130. Moreover, each molded counterweight 130 is disposed opposite a respective pin journal 120 relative to the centerline 116 for balance and stability. During manufacturing of the crankshaft 110, the counterweight 130 is molded with the at least one of the crank arms. In addition, each of the main journals 112, pin journals 120, counterweights, and crank arms 124 are made of the first metallic material discussed above.

Further in this example, the method 210 further comprises in box 214 melting the first metallic material at between 1400 degrees Celsius (° C.) and 1600° C. to define a molten metallic material. In one example, the first metallic material may be melted by the furnace 14 discussed above. The furnace may be an electric arc furnace, an induction furnace, or any other suitable furnace without departing from the spirit or scope of the present disclosure.

The method 210 further comprises in box 216 feeding the molten metallic material at a riser connection angle of between 30° and 75° in the cavities of the negative sand cast mold. In another example, the riser connection angle is between 31° and 65°. In yet another example, the riser connection angle is between 30° and 55°. The step of feeding may be accomplished by the feeding mechanism 16 discussed above to feed the molten metallic material in the at least one cavity of the mold defining the dimensions of the crankshaft 110 to be cast. As discussed above, the feeding mechanism 16 comprises a pouring ladle (not shown), a down sprue 31, a filter 32 in fluid communication with the down sprue 31, a runner 34 in fluid communication with the filter 32 and down sprue 31, and risers R1-R10 in fluid communication with the runner 34 and the at least one cavity of the mold 30.

In this example, the pouring ladle receives molten metallic material (e.g., steel alloy) for pouring the molten metallic material in the down sprue 31 having the filter 32 to eliminate oxides from the molten metallic material. As mentioned, the down sprue 31 is in fluid communication with the runner 34 through which the molten metallic material flows. As shown, the runner 34 is connected to the riser R1-R10 such that molten metallic material is feed thereto. As such, the runner 34 is arranged to be in fluid communication with the risers R1-R10 to which the molten metallic material is fed at a general riser connection angle of between 30° and 75° in the cavities of the negative sand cast mold. In one example, the riser connection angle is between 31° and 65°. In another example, the riser connection angle is between 30° and 55°.

As shown, the method 210 further comprises in box 220 cooling or solidifying the molten metallic material at a solidification time of between 5 seconds (sec) and 20 sec in the negative sand cast mold to define a solidified metallic material having dimensions of the cast steel alloy crankshaft. The step of solidifying may be accomplished by the cooling area 17 discussed above to solidify the molten metallic material to the solidified metallic material. In another example, the solidification time is between 10 sec and 15 sec defining the solidified metallic material. To achieve a desired solidification time range, the cooling area 17 may comprise a chill member disposed on at least one counterweight of the negative sand cast mold. The step of solidifying may involve allowing the molten metallic material to cool to about 450° C.

Alternatively, the method may comprise, prior to the step of feeding, disposing a chill member (see FIG. 8) on at least one counterweight of the negative sand cast mold to cool the molten metallic material at a desired solidification time.

In one example, the solidified metallic material has a porosity of less than 10 percent (%), an ultimate tensile strength (UTS) of 900 megapascal (MPa) to 1200 MPa, a yield strength (YS) greater than 750 MPa, and elongation (EL) of 5% to 10%.

The method 210 further comprises in box 222 separating the solidified metallic material from the negative sand cast mold to define the cast steel alloy crankshaft. As in the system 10 of FIG. 1, to accomplish removal of the mold from the cast crankshaft, an automated unit is used to break the mold and obtain the cast steel alloy crankshaft therefrom. For example, a vibration unit or table may be used having a bottom catch screen for receiving mold particles from the mold. It is to be understood that breaking the mold may be achieved by any suitable manner such as a vibrating unit without departing from the spirit or scope of the present disclosure.

In this example, the step of separating may comprise degating the target crankshaft casting after removing the mold from the crankshaft and cleaning the target crankshaft casting after degating. As in the system 10 of FIG. 1, a shot blast machine may be used to apply or shoot metallic beads on surfaces of the target crankshaft casting. To meet design expectations, the separation unit may also include an inspection area wherein the target crankshaft casting is inspected for its dimensions, mechanical properties, chemical composition, and microstructure. For example, a computerized system such as a CMM may be used to measure mechanical dimensions of the target crankshaft, defining the crankshaft of the present disclosure. Any suitable methods and apparatus may be implemented to evaluate mechanical dimensions, mechanical properties, chemical composition, and microstructure of the crankshaft without departing from the spirit or scope of the present disclosure.

In one example, the first metallic material comprises a steel alloy. In one example, the first metallic material has a composition comprising weight percent (wt %) to 0.65 wt % carbon (C), 0.40 wt % to 0.80 wt % silicon (Si), 0.6 wt % to 1.5 wt % manganese (Mn), at least 0.03 wt % phosphorous (P); wt % to 0.07 wt % sulfur (S), 0.8 wt % to 1.4 wt % chromium (Cr), 0.2 wt % to nickel (Ni), 0.15 wt % to 0.55 wt % molybdenum (Mo), 0.25 wt % to 2.0 wt % copper (Cu), at least 0.03 wt % titanium (Ti), 0.07 wt % to 0.17 wt % vanadium (V), 0.02 wt % to 0.06 wt % aluminum (Al), at least 0.03 wt % nitrogen (N), 0.01 wt % to 0.06 wt % one of cerium (Ce) and lanthanum (La), and a balance of iron (Fe).

More preferably, the first metallic material comprises: 0.35 wt % C, 0.45 wt % Si, 1.0 wt % Mn, at least 0.03 wt % P, 0.06 S, 1.0 wt % Cr, 0.2 wt % Ni, 0.25 wt % Mo, 0.45 wt % Cu, at least 0.03 wt % Ti, 0.1 wt % V, 0.03 wt % Al, at least 0.03 wt % N, 0.02 wt % of one of Ce and La, and a balance of Fe.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of manufacturing a cast steel alloy crankshaft for an internal combustion engine, the method comprising:
   providing a negative sand cast mold of the crankshaft, the negative sand cast mold having cavities to form the crankshaft, the crankshaft comprising:
      at least four main journals aligned on a crankshaft axis of rotation defining a centerline; and
      at least three pin journals, each pin journal being disposed about a respective pin journal axis and positioned between the main journals, each of the respective pin journal axes being oriented parallel to and spaced radially from the crankshaft axis, each of the pin journals being joined to a pair of crank arms for force transmission between the pin journal and the pair of crank arms, each pair of crank arms being joined to a respective main journal for transmitting torque between the pair of crank arms and the main journal, each crank arm having a counterweight disposed opposite a respective pin journal relative to the centerline for balance and stability;
   melting a first metallic material at a predetermined temperature to define a molten metallic material;
   feeding the molten metallic material at a general riser connection angle of between 30° and 75° in the cavities of the negative sand cast mold;
   cooling the molten metallic material at a predetermined solidification time in the negative sand cast mold to define a solidified metallic material having dimensions of the cast steel alloy crankshaft, wherein the predetermined solidification time is between 5 sec and 20 sec; and
   separating the solidified metallic material from the negative sand cast mold to define the cast steel alloy crankshaft.

2. The method of claim 1 wherein the solidified metallic material has a porosity of less than 10 percent (%).

3. The method of claim 1 wherein the solidified metallic material has an ultimate tensile strength (UTS) of 900 megapascal (MPa) to 1200 MPa, a yield strength (YS) greater than 750 MPa, and elongation (EL) of 5% to 10%.

4. The method of claim 1 wherein the first metallic material comprises: 0.29 weight percent (wt %) to 0.65 wt % carbon (C), 0.40 wt % to 0.80 wt % silicon (Si), 0.6 wt % to 1.5 wt % manganese (Mn), at least 0.03 wt % phosphorous (P); 0.04 wt % to 0.07 wt % sulfur (S), 0.8 wt % to 1.4 wt % chromium (Cr), 0.2 wt % to 0.6 nickel (Ni), 0.15 wt % to 0.55 wt % molybdenum (Mo), 0.25 wt % to 2.0 wt % copper (Cu), at least 0.03 wt % titanium (Ti), 0.07 wt % to 0.17 wt % vanadium (V), 0.02 wt % to 0.06 wt % aluminum (Al), at least 0.03 wt % nitrogen (N), 0.01 wt % to 0.06 wt % one of cerium (Ce) and lanthanum (La), and a balance of iron (Fe).

5. The method of claim 1 wherein the general riser connection angle is between 31° and 65°.

6. The method of claim 1 wherein the general riser connection angle is between 30° and 55°.

7. The method of claim 1 further comprising:
   prior to the step of feeding, disposing a chill member on at least one counterweight of the negative sand cast mold.

\* \* \* \* \*